(12) United States Patent
Smaak et al.

(10) Patent No.: US 9,020,620 B2
(45) Date of Patent: Apr. 28, 2015

(54) RECORDING APPARATUS AND METHOD FOR A STORAGE MEDIUM EXCHANGE DURING RECORDING

(75) Inventors: Marc Smaak, Bergen op Zoom (NL); Henk Goudsmits, Best (NL); Sjack Schellekens, Tilburg (NL); Ronald Ten Hove, Oud Vossemeer (NL)

(73) Assignee: Robert Bosch GmbH, Stuttgart (DE)

( * ) Notice: Subject to any disclaimer, the term of this patent is extended or adjusted under 35 U.S.C. 154(b) by 1521 days.

(21) Appl. No.: 12/299,035

(22) PCT Filed: Jul. 25, 2006

(86) PCT No.: PCT/EP2006/064637
§ 371 (c)(1),
(2), (4) Date: Oct. 30, 2008

(87) PCT Pub. No.: WO2008/011914
PCT Pub. Date: Jan. 31, 2008

(65) Prior Publication Data
US 2010/0004765 A1 Jan. 7, 2010

(51) Int. Cl.
*G06F 17/00* (2006.01)
*G11B 20/10* (2006.01)
(Continued)

(52) U.S. Cl.
CPC ...... *G11B 20/10* (2013.01); *G11B 2020/10944* (2013.01); *G11B 19/10* (2013.01);
(Continued)

(58) Field of Classification Search
CPC ............. G11B 20/10; G11B 20/10527; G11B 2020/10944; G11B 2020/00014; G11B 2020/00057; G11B 2020/10638; G11B 2020/10675; G11B 2020/10824; G11B 2020/10972; G11B 27/002; G11B 27/10; H04N 5/765; H04N 5/781; H04N 5/85; H04N 5/907; H04N 5/8042
USPC ............................................................ 700/94
See application file for complete search history.

(56) References Cited

U.S. PATENT DOCUMENTS 5,748,585 A * 5/1998 Tsukamoto et al. ........ 369/47.23
5,900,010 A * 5/1999 Aoki et al. .................... 711/114
(Continued)

FOREIGN PATENT DOCUMENTS

DE 102 25 623 12/2003
EP 0 866 460 9/1998
(Continued)

*Primary Examiner* — Paul McCord
(74) *Attorney, Agent, or Firm* — Michael J. Striker

(57) ABSTRACT

Recording devices are often used to record discussions, conferences, meetings and the like. The recorded information is reviewed or processed afterwards for example in order to prepare minutes or notes. The known state of the art proposes to use devices comprising two receptacles for tapes. But this solution adds cost to the recording devices, which will not be accepted from all potential buyers as only a small number of the buyers will actually use this functionality. A recording apparatus (1) for recording of audio signals is proposed comprising an external interface (6) for an exchangeable storage medium (7) and an intermediate memory device (5), whereby the recording apparatus (1) is realized to use the intermediate memory device (5) and the storage medium (7) for storing the audio signals, whereby the recording apparatus (1) is realized for an interruption-free storage of the audio-signals during a storage medium (7) exchange, wherein a first storage medium is exchanged by a second storage medium, whereby during the storage medium (7) exchange the audio signals are stored on the intermediate memory device (5) and whereby the audio signals stored on the intermediate memory device (5) are transferred to the second storage medium.

16 Claims, 1 Drawing Sheet

(51) Int. Cl.
    *G11B 19/10*     (2006.01)
    *G11B 27/00*     (2006.01)
    *G11B 27/10*     (2006.01)
    *H04N 5/765*     (2006.01)
    *G11B 20/00*     (2006.01)
    *H04N 5/781*     (2006.01)
    *H04N 5/85*     (2006.01)
    *H04N 5/907*     (2006.01)
    *H04N 9/804*     (2006.01)

(52) U.S. Cl.
    CPC ........ *G11B20/10527* (2013.01); *G11B 27/002* (2013.01); *G11B 27/10* (2013.01); *G11B 2020/00014* (2013.01); *G11B 2020/00057* (2013.01); *G11B 2020/10638* (2013.01); *G11B 2020/10675* (2013.01); *G11B 2020/10824* (2013.01); *G11B 2020/10972* (2013.01); *H04N 5/765* (2013.01); *H04N 5/781* (2013.01); *H04N 5/85* (2013.01); *H04N 5/907* (2013.01); *H04N 9/8042* (2013.01)

(56) References Cited

U.S. PATENT DOCUMENTS

| | | | | |
|---|---|---|---|---|
| 5,912,866 | A * | 6/1999 | Kamada et al. | 711/111 |
| 6,259,859 | B1 * | 7/2001 | Katsuki et al. | 386/338 |
| 6,373,798 | B1 * | 4/2002 | Arai | 369/47.23 |
| 6,560,174 | B1 * | 5/2003 | Takenaka | 369/47.12 |
| 6,795,640 | B1 * | 9/2004 | Honda | 386/248 |
| 7,770,199 | B2 * | 8/2010 | Slater et al. | 725/94 |
| 7,873,426 | B2 * | 1/2011 | Yamada | 700/94 |
| RE42,709 | E * | 9/2011 | Washino et al. | 348/722 |
| 2001/0002183 | A1 * | 5/2001 | Kimura et al. | 369/47.25 |
| 2002/0133247 | A1 * | 9/2002 | Smith et al. | 700/94 |
| 2003/0227830 | A1 | 12/2003 | Lauke | |
| 2006/0013096 | A1 * | 1/2006 | Holmes | 369/53.21 |
| 2007/0055979 | A1 * | 3/2007 | Van Gassel et al. | 725/1 |
| 2008/0094520 | A1 * | 4/2008 | Tkachenko et al. | 348/705 |

FOREIGN PATENT DOCUMENTS

| | | |
|---|---|---|
| EP | 0 926 904 | 6/1999 |
| EP | 0 962 927 | 12/1999 |
| EP | 1 096 495 | 5/2001 |
| JP | 07168600 | 7/1995 |
| JP | 80877682 | 3/1996 |
| JP | 2001-351328 | 12/2001 |
| JP | 2004-088328 | 3/2004 |
| JP | 2004088328 A * | 3/2004 |
| JP | 2005-339620 | 12/2005 |
| WO | 2004/032139 | 4/2004 |

* cited by examiner

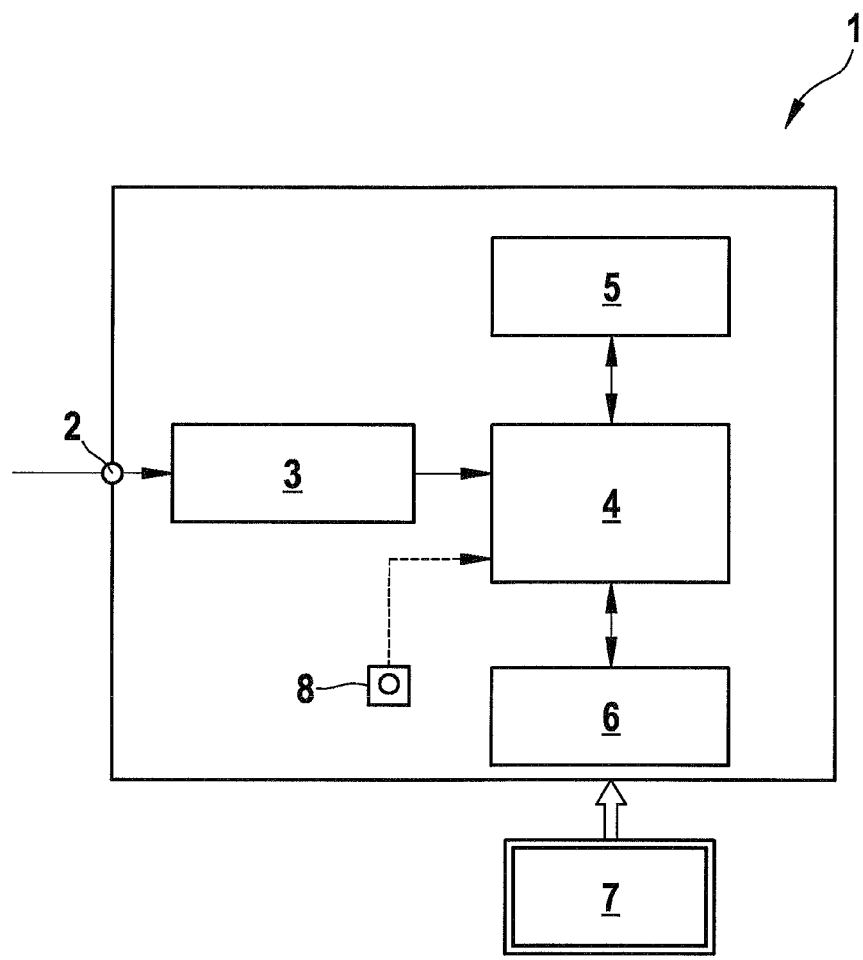

RECORDING APPARATUS AND METHOD FOR A STORAGE MEDIUM EXCHANGE DURING RECORDING

PRIOR ART

This invention relates to a recording apparatus for recording of audio signals and a method for a storage medium exchange during recording. More specifically, the invention relates to a recording apparatus for recording of audio signals comprising an external interface for an exchangeable storage medium and an intermediate memory device, whereby the recording apparatus is realized to use the memory device and the storage medium for storing the audio signals, and a method for a storage medium exchange in a recording apparatus during recording of audio signals, whereby during the storage medium exchange the audio signals are stored in an intermediate memory device.

Recording devices are often used to record discussions, conferences, meetings and the like. The recorded information is reviewed or processed afterwards for example in order to prepare minutes or notes.

It is known that magnetic recorders, for example tape recorders, often have the possibility to insert in parallel two separate recording mediums, for example tapes. This embodiment allows to continue the recording when the first of the two separate recording mediums is full at the second recording medium. When recording is switched to the second recording medium the user has the possibility to exchange the first recording medium by an empty one without interrupting the recording. An additional advantage of this dual medium functionality is that the user can already process the recording from the first recording medium while the recording at the second medium is still running. Such recorders are often used to record a meeting or conference that runs for many hours.

The document DE 102 25 623 A1, which appears to be the closest prior art, discloses a method for recording of audio signals for example in connection with a car radio. The method proposes to delay the received audio signals by means of a buffer memory and—as a reaction on a recording command—to store the buffered audio-signals on a further memory device, which is for example realized as a MMC (multi media card). The idea of the proposed method is to allow a user to record a complete song or the like at the memory device, also in the case the radio transmission of the song had already started before the recording command was given.

DISCLOSURE OF THE INVENTION

According to the invention a recording apparatus with the features of claim 1 and a method for a storage medium exchange in a recording apparatus during recording of audio signals with the features of claim 11 are proposed. Advantageous or preferred embodiments are disclosed in the description and the figures or claimed by the dependent claims.

The recording apparatus according to the invention is used for recording discussions, conferences, meetings and the like and is realized to provide a long-time and interruption-free recording of audio-signals on at least two storage mediums, whereby the at least two storage mediums are subsequently used. For receiving and connecting of the storage mediums the recording apparatus comprises an external interface. The external interface is embodied so that a user is capable to exchange the storage mediums preferably without the need of using a tool.

Further an intermediate memory device is part of the recording apparatus. Preferably the intermediate memory device is internal and/or integrated in the recording apparatus. Especially the intermediate device is not realized as a user-exchangeable device.

The external interface or the storage medium inserted in the external interface respectively and the intermediate memory device are connected so that the recording apparatus stores audio signals selectively on both, i.e. the intermediate memory device and/or the inserted storage device.

According to the invention the recording apparatus is realized for an interruption-free storage of the audio-signals during a storage medium exchange, wherein during the storage medium exchange a first storage medium is exchanged by a second storage medium. During the storage medium exchange the audio signals are stored on the intermediate memory device and the stored audio signals are transferred from the intermediate memory device to the second storage medium after the storage medium exchange is finished.

The intermediate memory device is thus preferably embodied as a buffer memory buffering or delaying the incoming audio signals during the time in which the external interface is not equipped with a storage medium or in case the storage medium is full until a new or empty storage medium is inserted into the external interface.

The underlying idea of the invention is based on the following thoughts: With today's audio compression and large storage media it is possible to record at one single storage media for many hours or even days or weeks. However some users still want to have the ability to already process part of the recording before a meeting has ended. Furthermore the user wants to take the recording at a physical device from the room of the recording device to a further room in which a further device for processing the recording is placed in order to simplify installation and security issues compared to a network solution. The known state of the art proposes to use devices comprising two receptacles for tapes. But this solution adds cost to the recording devices, which will not be accepted from all potential buyers as only a small number of the buyers will actually use this functionality.

In order to overcome the disadvantages of the known devices the proposed recording apparatus provides the possibility of exchange of the storage media during recording without loosing information and without additional costs for a second receptacle.

Preferably the recording apparatus is part of a conference system further comprising microphones, which are connected to the recording device in order to provide the recording device with audio signals. Preferably the recording apparatus can additionally be used to record video signals, in this case the conference system may comprise additionally video cameras.

In a preferred embodiment the storage medium is a flash memory, an optical memory, a magnetic memory, a disk memory, a memory card, a MMC (multimedia card), a SD, a mini SD, USB stick, Memory stick or a exchangeable hard disk, especially a micro hard disk. Accordingly the external interface is an interface slot or a card reader for receiving and connecting the storage medium. The advantage of this embodiment is that the use of common storage mediums allows a processing of the recordings with conventional computers. Furthermore such common storage mediums are widely known and easy to handle by the user.

In a further preferred and especially cost-effective embodiment the recording apparatus comprises only one single external interface or interface slot for receiving the storage medium.

In another embodiment of the recording apparatus the intermediate memory device is carried out to be used by further processes of the recording apparatus. As an example the intermediate memory device is used as a "shockproof memory" to buffer signal streams from a CD or DVD. In general the intermediate memory device has preferably a storage capacity which is sufficient to store about up to 1 min or up to 5 min of the audio signals. Preferably the intermediate memory device is organized in a FIFO (first in first out) architecture. In case the recording apparatus is also used for storing video signals the intermediate memory device is preferably adapted to store audio and video signals for the same time period.

In a further preferred embodiment the recorder apparatus comprises an audio and/or video compressing unit for compressing the incoming audio and/or video signals respectively and/or for compressing the audio and/or video signals stored on the intermediate memory device. The compression is preferably based on the known standards, for example MPEG. In this embodiment not the incoming audio and/or video signals but the compressed signals are stored on the memory device and/or on the storage medium. Preferably the phrases audio signals and compressed audio signals are used synonymously in the present disclosure.

In a preferred realization of the invention the recording apparatus comprises a control unit, which controls the distribution of the audio signals between the intermediate memory device and the storage medium. This is preferably realized in that the control unit is realized to select the intermediate memory device or the storage medium or both for storing the audio signals. The unit control is able to switch the stream of audio signals between the intermediate memory device or the storage medium or to store the audio signals on both in parallel.

In still a further practical embodiment the control unit is arranged to transfer stored audio signals from the intermediate memory device to the storage medium. This embodiment is one practical way to realize the aim of the invention, which is to make an exchange of the storage medium possible during recording without loosing information of the audio signal. This aim is preferably reached by intermediately storing the audio signal on the intermediate memory device during storage medium exchange and by transferring the stored audio signals to the new storage medium after the exchange.

Preferably in order to generate a trigger signal for the control unit the recording apparatus may comprise a detection unit for automatically detecting the storage medium exchange. This detection unit is for example realized as a switch which is automatically activated in case the storage medium is removed from the recording apparatus. Alternatively a switching device for manually indicating the storage medium exchange may be used. Further alternatively the detection unit is embodied as a software detection of storage medium removal.

In a further embodiment the recording apparatus is realized to provide an temporary overlap of the recording of the audio signals between the first and the second storage medium. For instance the last 30 seconds of the recordings of the first storage medium are also present at the first 30 seconds of the second storage medium. This embodiment makes it easier to process the recordings afterwards.

Summarized there are at least two operational modes of the recording apparatus:

In a first operational mode when the user wants to exchange the storage medium he will simply remove the first storage medium from the recording apparatus. Optionally the exchange is indicated to the recording apparatus by automatic detection or by manually activating a switching device. The recording apparatus will continue recording in the intermediate memory device. The user has a certain time (e.g. 1 minute) to place the second storage medium in the recording device, especially in the same external interface or in the same interface slot. Once the recording device has detected the second storage medium it will move the recording from the intermediate memory device into the second storage medium.

A second operational mode differs from the first operational mode only by the fact that an temporal overlap of the recording between the first and the second medium is provided to simplify a later processing of the recordings.

The invention further relates to a method for a storage medium exchange in a recording apparatus during recording of audio signals, whereby during exchange of the storage medium, wherein a first storage medium is exchanged by a second storage medium, the audio signals are stored in an intermediate memory device and are transferred after the exchange of the storage medium to the second storage medium.

The method is preferably carried out on a recording device according one of the claims 1 to 10 and/or as described previously. Especially the method secures that the audio signals are saved to the storage mediums without an interruption and/or without information loss and/or with a temporary overlap. Preferably the term without an interruption or interruption-free means that from the data finally stored on the storage mediums the original audio signals can be revealed without having an interruption due to the exchange of the storage mediums.

Further a computer program is disclosed comprising program code means for performing all the steps of any of the claims 10 or 11 when said program is run on a computer and/or on a recording apparatus according to the claims 1 to 9.

BRIEF DESCRIPTION OF THE DRAWINGS

These as well as further features and advantages of the invention will be better appreciated by reading the following detailed description of a presently preferred exemplary embodiment taken in conjunction with the accompanying drawing of which:

FIG. 1 shows a schematic block diagram for illustrating the preferred embodiment of the recording apparatus as well as an embodiment of the method according to the invention.

DETAILED DESCRIPTION OF PREFERRED EMBODIMENTS

FIG. 1 shows a functional block diagram of a recording apparatus 1 according to the invention. The recording apparatus 1 comprises an audio input 2, which is connectable or connected with one or more audio sources like microphones (not shown).

The recording apparatus 1 comprises an analog to digital converter 3, which is arranged and realized for converting the incoming audio signals, i.e. the audio input, into a digital data stream. The converter 3 is connected to a control unit 4, which comprises a recording processor and audio compression functionality to compress the digital data stream according to a common standard like MPEG 2 or MP 3.

The control unit 4 is connected by a bi-directional connection to a intermediate memory device 5. This intermediate memory device 5 is a integral and/or integrated part of the recording apparatus 1, which cannot be exchanged by a user of the recording apparatus 1. The storage capacity of the intermediate memory device 5 is chosen to store up to 1 minute, preferably up to 3 min and especially up to 5 min of the audio signal or the respective compressed audio signal. The intermediate memory device is used for further functions within the recording apparatus 1, for example as a shockproof memory or as a memory for the running application program for managing and storing the incoming audio and/or video signals.

Furthermore the control unit 4 is connected by a unidirectional (not shown) or a bi-directional connection to a smart media interface 6, for example in form of a interface slot. In this preferred embodiment the recording apparatus only comprises one single smart media interface 6. The smart media interface 6 is adapted to receive and connect a smart media storage 7, like a flash card. The smart media interface 6 is arranged so that a user can exchange the smart media storage 7 within normal operation or use of the recording apparatus 1.

Optionally a switching device 8 is part of the recording apparatus 1, which can be manually triggered by the user and is connected to the control unit 4.

From a functional point of view the recording apparatus 1 is realized, especially programmed or wired, to allow an exchange of the smart media storage 7 during recording without loosing information, so that the audio signals of the conference or meeting, which shall be recorded, are stored on at least two smart media storages 7, whereby a first part of the audio signals is stored on the first smart media storage 7 and a second part is stored on the second smart media storage 7 and whereby the two parts of audio signals represent the complete recorded conference or meeting especially without an interruption. Of course a third and following parts of the conference or meeting can be stored on further smart media storages 7. Although the principle of the recording apparatus 1 was illustrated in connection with conferences and meetings and in view of audio signals the recording apparatus 1 can also be used within other applications, like audio telephone notes in a office. Furthermore additionally video information or additional information may be recorded in a similar manner.

For the realization of the functionality of a storage medium exchange while recording without information loss the recording apparatus 1 uses the underlying principle that as soon as the smart media storage 7 is removed from the smart media interface 6, the incoming audio signals (or the compressed audio signals respectively) are intermediately stored on the intermediate memory device 5. As soon as a new smart media storage 7 is inserted into the smart media interface 6 the stored audio signals are transferred to the new smart media storage 7, so that no temporal gap of the audio signals remains between the part stored on the removed and the new smart media storage 7.

As an optional feature of the recording apparatus 1 some overlap, for example 30 seconds, is provided between the part stored on the removed and the new smart media storage 7. This optional feature simplifies the processing of the recordings. A possible realization of this feature is that the intermediate memory device 5 records the audio signals in parallel to the smart media storage 7, whereby preferably only the last 1 minute is stored, which can be realized for example by a FIFO-structure of the intermediate memory device 5. After the exchange of the smart media storage 7 the audio signals referring to a time period, for example 30 seconds, before removing the previous smart media storage 7 and additionally the audio signals referring to the time period, whereas no smart media storage 7 was available for storing are transferred to the new smart media storage 7.

Furthermore it is possible that the user indicates the exchange of the smart media storage 7 by activating the switching device 8. In a practical realization the control unit 4 organizes after receiving the activating signal from the switching device 8 that the audio signals are stored on the intermediate memory device 5 and the smart media device 7 in parallel in order to allow an overlap of the audio signals as already discussed above.

The invention claimed is:

1. Recording apparatus (1) for use in a conference system for recording of audio signals resulting from discussions, conferences and meetings, the recording apparatus comprising an external interface (6) for an exchangeable storage medium (7) for storing the audio signals,
an intermediate memory device (5) for storing the audio signals, and
a switching device (8),
wherein the recording apparatus (1) provides interruption-free storage of the audio signals during an exchange of the exchangeable storage medium (7) initiated by user activation of the switching device, during which exchange a first storage medium (7) is exchanged by a second storage medium (7), the audio signals recorded during the exchange are stored on the intermediate memory device (5) and transferred from the intermediate memory device (5) to the second storage medium (7) upon insertion of the second storage medium in the external interface (6), including an overlap of the recording of the audio signals between the first storage medium (7) and the second storage medium (7).

2. Recording apparatus (1) according to claim 1, wherein the storage medium (7) comprises any of the group consisting of a flash memory, a disk memory or memory card, a MMC and wherein the external interface (6) comprises an interface slot for receiving the storage medium (7).

3. Recording apparatus (1) according to claim 1, wherein there is only one external interface (6) for the exchangeable storage medium (7) or only one interface slot for receiving the storage medium (7).

4. Recording apparatus (1) according to claim 1, wherein the intermediate memory device (5) is configured for use by further processes of the recording apparatus.

5. Recording apparatus (1) according to claim 1, further comprising an audio compressing unit (4) for compressing the audio signals.

6. Recording apparatus (1) according to claim 1, further comprising a control unit (4) that controls distribution of the audio signals between the intermediate memory device (5) and the storage medium (7).

7. Recording apparatus (1) according to claim 6, wherein the control unit (4) selects the intermediate memory device (5) or the storage medium (7) or both for storing the audio signals.

8. Recording apparatus (1) according to claim 6, wherein the control unit (4) transfers stored audio signals from the intermediate memory device (5) to the storage medium (7).

9. Recording apparatus (1) according to claim 1, further comprising a detection unit for automatically detecting the storage medium exchange.

10. Method for a storage medium exchange in a recording apparatus (1) during discussions, conferences and meetings, the method comprising steps of:

recording audio signals during the discussions, the conferences and the meetings,
storing the recorded audio signals on exchangeable storage media (7),
activating a switching device (8) to indicate an exchange of exchangeable storage media (7), and exchanging a first storage medium of the exchangeable storage media (7) by a second storage medium of the exchangeable storage media (7), wherein during the exchanging, the audio signals recorded during the exchanging are stored in an intermediate memory device (5) and are transferred after the exchanging from the intermediate memory device to the second storage medium such that an overlap of the recording of the audio signals between the first storage medium (7) and the second storage medium (7) is realized.

11. Method according to claim 10, whereby the audio signals are stored on the exchangeable storage media (7) without an interruption.

12. Method according to claim 10, whereby video and audio signals are recorded and managed by the same method.

13. A conference system designed for supporting discussions, conferences and meetings, the conference system including a recording apparatus (1) for recording audio signals, comprising an external interface (6) for an exchangeable storage medium (7) for storing the audio signals, an intermediate memory device (5) for storing the audio signals, and a switching device (8), wherein the recording apparatus (1) provides interruption-free storage of the audio signals during an exchange in which a first storage medium (7) is exchanged by a second storage medium (7) by storing audio signals recorded during the discussions, the conferences and the meetings on the intermediate memory device (5) during the exchange in response to switching device activation and transferring the stored audio signals from the intermediate memory device (5) to the second storage medium (7) when the second storage medium (7) is inserted in the external interface (6) in such a way that an overlap of the recording of the audio signals including the audio signals recorded during the exchange, between the first storage medium (7) and the second storage medium (7) is provided; and wherein the overlap is 30 seconds.

14. The conference system of claim 13, wherein the recording apparatus (1) further comprises an audio compressing unit (4) for compressing the audio signals.

15. The conference system of claim 13, wherein the recording apparatus (1) further comprises a control unit (4) for controlling distribution of the audio signals between the intermediate memory device (5) and the storage medium (7).

16. The conference system of claim 15, wherein the control unit (4) selects the intermediate memory device (5) or the storage medium (7) or both for storing the audio signals.

\* \* \* \* \*